(12) United States Patent
Wang et al.

(10) Patent No.: US 11,429,766 B2
(45) Date of Patent: Aug. 30, 2022

(54) METHOD TO SIMULATE BOP SHEARING

(71) Applicant: Cameron International Corporation, Houston, TX (US)

(72) Inventors: Yaou Wang, Sugar Land, TX (US); Christopher Nault, Houston, TX (US); Michael W. Berckenhoff, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 136 days.

(21) Appl. No.: 16/398,681

(22) Filed: Apr. 30, 2019

(65) Prior Publication Data

US 2019/0340322 A1    Nov. 7, 2019

Related U.S. Application Data

(60) Provisional application No. 62/666,757, filed on May 4, 2018.

(51) Int. Cl.
*G06F 17/10* (2006.01)
*G06F 30/23* (2020.01)
*E21B 33/06* (2006.01)
*E21B 41/00* (2006.01)
*G06F 111/10* (2020.01)

(52) U.S. Cl.
CPC .......... *G06F 30/23* (2020.01); *E21B 33/063* (2013.01); *E21B 41/0092* (2013.01); *G06F 2111/10* (2020.01)

(58) Field of Classification Search
CPC ...... G06F 30/20; G06F 30/23; G06F 2111/10; E21B 33/063; E21B 41/0092
USPC .......................................................... 703/2
See application file for complete search history.

(56) References Cited

U.S. PATENT DOCUMENTS

| 7,027,968 B2 * | 4/2006 | Choe ............... E21B 21/001 175/60 |
| 2008/0027693 A1 * | 1/2008 | Khandoker ........... G06F 30/23 703/7 |
| 2016/0070024 A1 * | 3/2016 | Berard ............... G01V 99/005 703/10 |
| 2018/0106143 A1 * | 4/2018 | Min ................ G01V 99/005 |

OTHER PUBLICATIONS

Han, Chuanjun et al., "Study of the damage and failure of the shear ram of the blowout preventer in the shearing process", Engineering Failure Analysis 58 (2015) 83-95) (Year: 2015).*
Liu, Z.G. et al., "Force prediction in blow-out preventer shearing of drill pipes", Engineering Failure Analysis 74 (2017) 159-171 (Year: 2017).*

(Continued)

*Primary Examiner* — Andre Pierre Louis
(74) *Attorney, Agent, or Firm* — Kelly McKinney

(57) ABSTRACT

A method to create a simulation of a shearing process for a ram blowout preventer (BOP) comprising the steps of building a 3D digital model of the ram BOP including damage parameters based on generic material properties of the ram BOP; inputting the 3D digital model of the ram BOP into a damage model; and simulating the shearing process using the 3D digital model of the ram BOP and the damage model.

17 Claims, 6 Drawing Sheets

(56) References Cited

OTHER PUBLICATIONS

Tekin A et al. "Estimation of shear force for blind shear ram blowout preventers." Research on Engineering Structures & Materials, 2015; 1: 39-51 (Year: 2015).*

Tulimilli et al., Design Study of BOP Shear Rams based on Validated Simulation Model and Sensitivity Studies, Proceedings of the ASME 33rd International Conference on Ocean, Offshore and Arctic Engineering, Jun. 8-13, 2014, OMAE2014-24305, pp. 1-9.

McCleney et al., Modeling of Subsea BOP Shear and Sealing Ability Under Flowing Conditions, Offshore Technology Conference, Houston, Texas, USA, OTC-28906-MS, Apr. 30, 2018, pp. 1-17.

* cited by examiner

METHOD TO SIMULATE BOP SHEARING

CROSS REFERENCE TO RELATED APPLICATIONS

This application claims the benefit of priority to U.S. Provisional Patent Application 62/666,757, filed on May 4, 2018, the entire content of which is incorporated herein by reference.

BACKGROUND

This section is intended to introduce the reader to various aspects of art that may be related to various aspects of the present disclosure, which are described or claimed below. This discussion is believed to be helpful in providing the reader with background information to facilitate a better understanding of the various aspects of the present disclosure. Accordingly, it should be understood that these statements are to be read in this light, and not as admissions of prior art.

This present disclosure relates to a method to create a simulation of a shearing process for a ram blowout preventer ("BOP") from a built digital avatar model of such BOP. The method comprises 3D (tridimensional) visualization of the shearing process and prediction on the shearing force/pressure, pipe deformation, and blade deformation based on the created BOP avatar.

Blowout preventers are used extensively throughout the oil and gas industry. Typical BOPs are used as a large specialized valve or similar mechanical device that seal, control, and monitor oil and gas wells. They serve as a safety valve in the drilling process and will be closed if an influx of formation fluids occurs. This event, commonly referred to as a kick, threatens the rig. The two categories of BOPs that are most prevalent are ram BOPs and annular BOPs. BOP stacks frequently utilize both types of BOPs, typically with at least one annular BOP stacked above several ram BOPs. The ram units in ram BOPs allow for shearing drill pipe in the case of shear rams, sealing off around drill pipe in the case of pipe rams, and sealing the BOP bore in the case of blind rams. Typically, a BOP stack may be secured to a wellhead and may provide a safe means for sealing the well in the event of a system failure.

Although the structure of the BOP is fairly known, the pipe shearing process is rather "invisible" since it is covered by a 'Black Box', the BOP body. To ensure the shearing process can be completed in the rig while in operation, multiple lab tests will thus be run to check the BOP's capability and the required shearing pressure for each type of drill pipe given by the operators.

SUMMARY

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments, it is disclosed a method to create a simulation of a shearing process for a ram blowout preventer ("BOP") from a built digital avatar model of such BOP. In embodiments of the disclosure, it is proposed a method to create a simulation of a shearing process for a ram blowout preventer (BOP) comprising the steps of: building a 3D digital model of the ram BOP including damage parameters based on generic material properties of the ram BOP; inputting the 3D digital model of the ram BOP into a damage model; and simulating the shearing process using the 3D digital model of the ram BOP and the damage model.

In embodiments of the disclosure, the generic material properties comprise at least one of chemical composition, elastic modulus, Poisson's ratio, yielding strength, tensile strength, elongation, reduction in area.

According to some embodiment of the disclosure, the damage parameters are inputted into the damage model.

According to some embodiment of the disclosure, steps are automated. In embodiments, the 3D digital model of the ram BOP automatically updates upon design update of the Ram BOP.

According to some embodiment of the disclosure, the dimensions of the 3D digital model of the ram BOP are varied and the simulation of the shearing process is iterated to optimize the ram BOP design.

According to some embodiment of the disclosure, the effect of design tolerance of the 3D digital model on the shear pressure of the ram BOP is predicted by automatically simulating the shearing process for different ram dimensions where the dimension's variance is due to tolerance.

It is proposed a method to build a prediction model to give prediction on shear pressure for a ram blowout preventer for a predefined range of operational parameters comprising: running a batch of shearing simulations to cover a plurality of different combinations in the predefined range of operational parameters; calculating the shear pressure for each combination; generating a response curve model using the calculated shear pressures for the plurality of different combinations.

BRIEF DESCRIPTION OF THE DRAWINGS

The subject disclosure is further described in the following detailed description, and the accompanying drawing and schematic of non-limiting embodiment of the subject disclosure. The features depicted in the figure are not necessarily shown to scale. Certain features of the embodiments may be shown exaggerated in scale or in somewhat schematic form, and some details of elements may not be shown in the interest of clarity and conciseness.

DETAILED DESCRIPTION

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
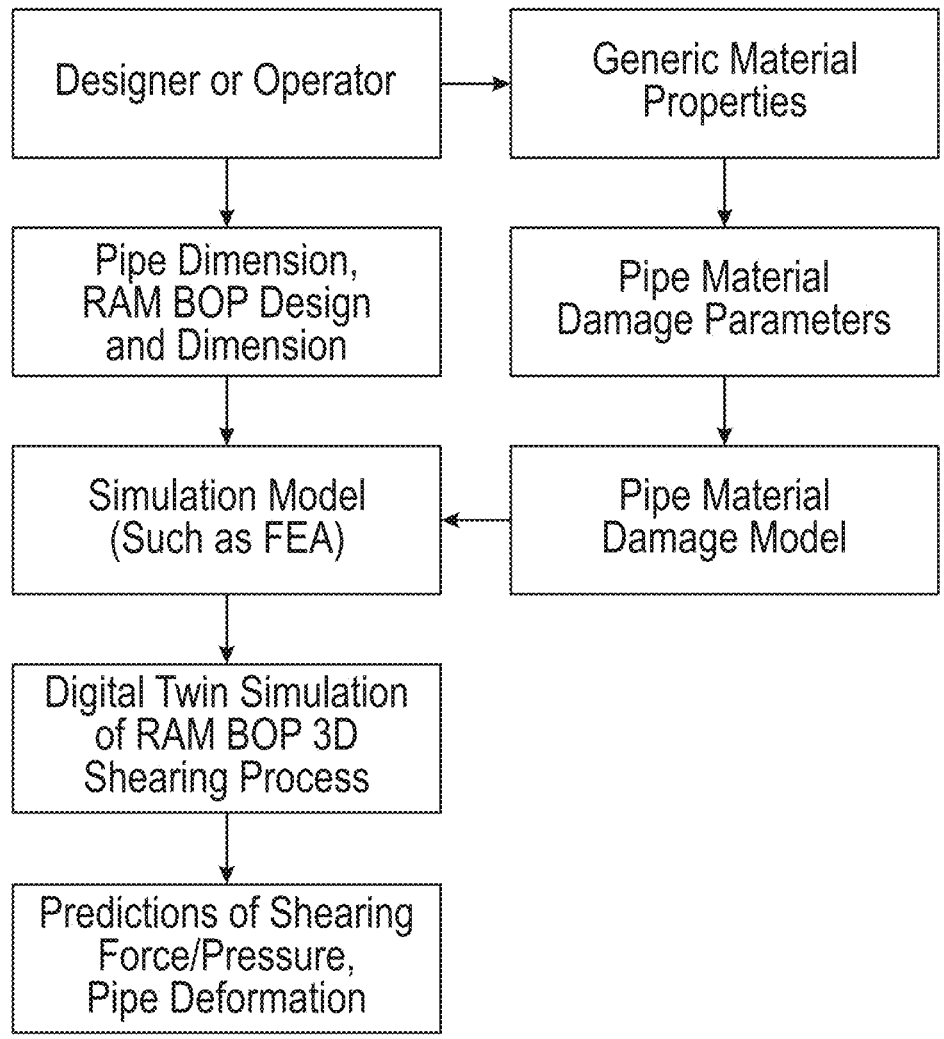
FIG. 1 is a flowchart describing the method to create a digital BOP avatar according to embodiments of the disclosure.

FIG. 1 flow chart describes the method to create a digital BOP avatar according to embodiments of the disclosure. A designer or operator inputs the pipe dimension and ram BOP design dimension, and then a simulation model is built up to generate a digital avatar of the BOP. The simulation model can be set up in commercial software, such as Abaqus and ANSYS, or by in-house code. At the same time, pipe generic material properties are also inputted and converted to pipe material damage parameter. The damage parameter is then imported in a damage model and then inputted to the simulation model. To simulate the shearing process, the material damage model and damage parameters are used to decide when and where crack occurs and how the crack will propagate. The damage model describes the local damage level of the material due to shearing process caused deformation. If the damage accumulation exceeds the maximum allowed level at certain location, crack will happen at that location. Then a shearing simulation is launched and a 3D shearing process is generated. The digital shearing simulation will generate the predictions of the shearing force/pressure, pipe deformation and blade deformation on the actual hardware ram BOP. The damage model can be any one of the currently published damage models which is suitable for the metal shearing/machining application, such as Johnson-Cook damage model (see details below).

Figure 2A:
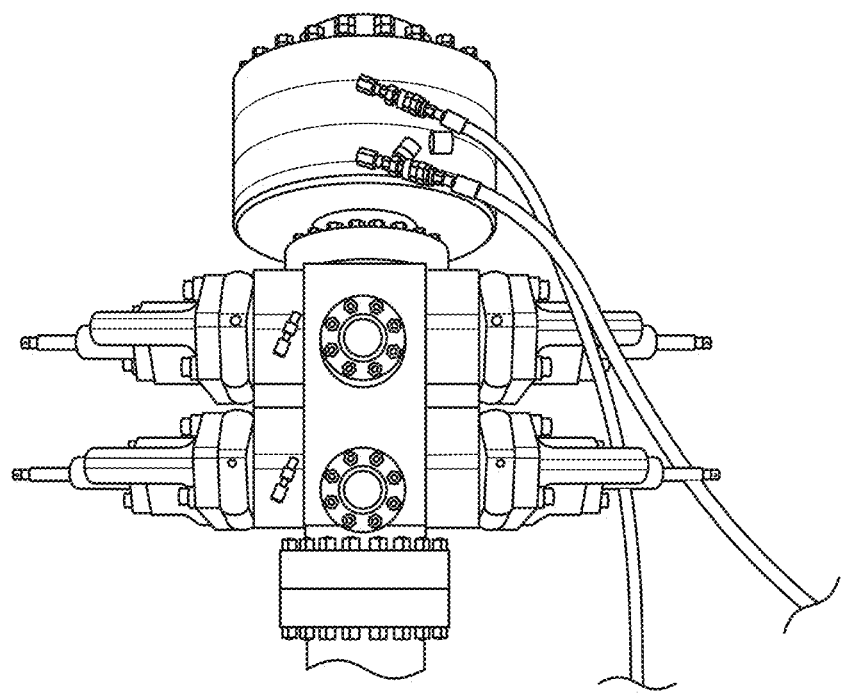
FIGS. 2A-2B are views of known ram BOP body and Ram blades respectively.
Figure 2B:
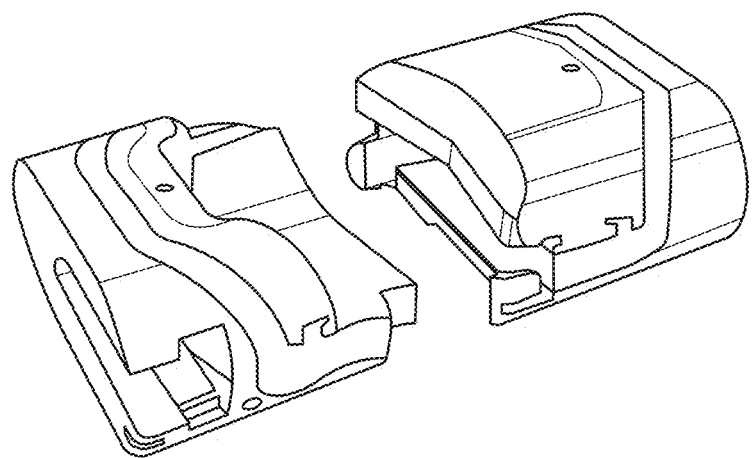

FIG. 2A shows a known ram BOP block. Inside the BOP, there are two ram blades as shown in FIG. 2B, which will move towards each other to shear drilling pipe and close the BOP.

Figure 3A:
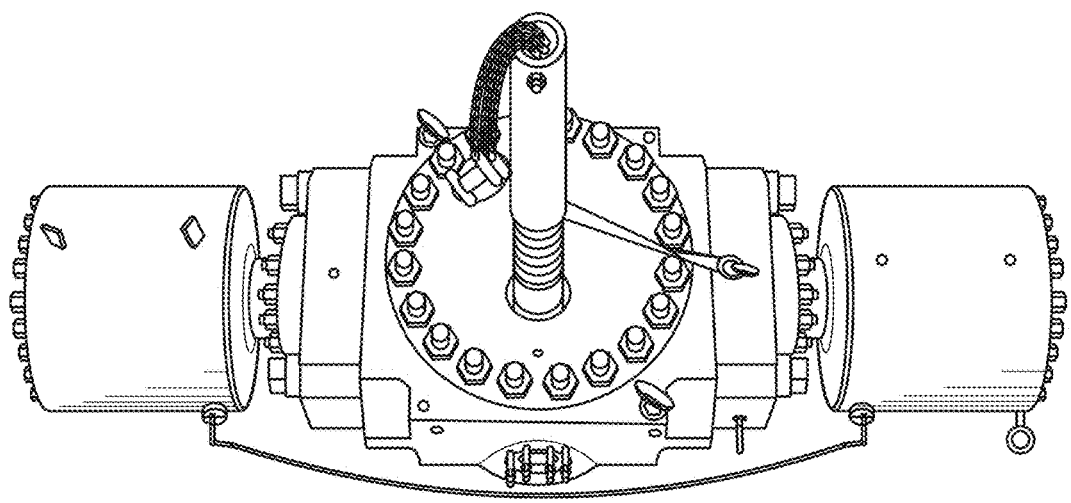
FIGS. 3A and 3B are examples of a ram BOP lab test fixture and shearing pressure test results.
Figure 3B:
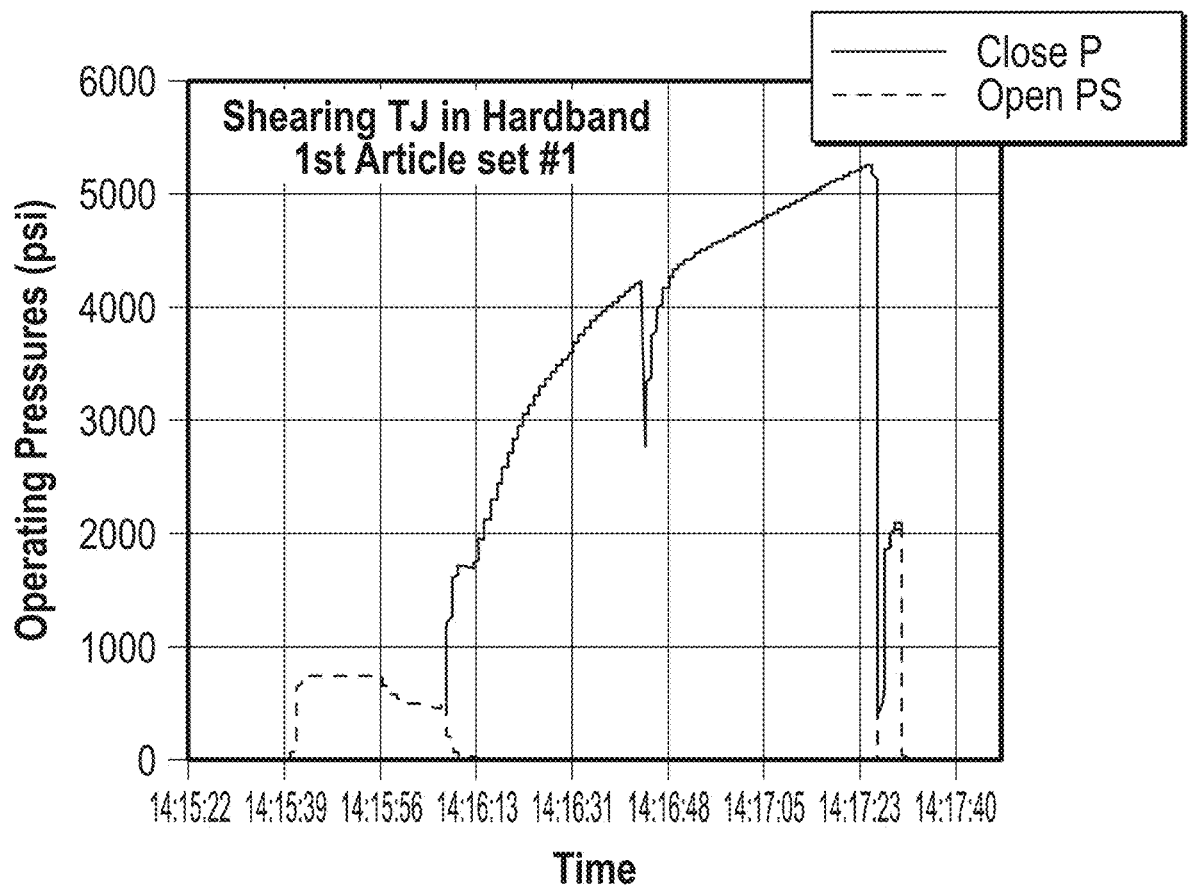

Traditionally, lab tests are run on a physical BOP itself to collect the required shearing pressure to close the BOP, as shown in FIGS. 3A and B.

Figure 4A:
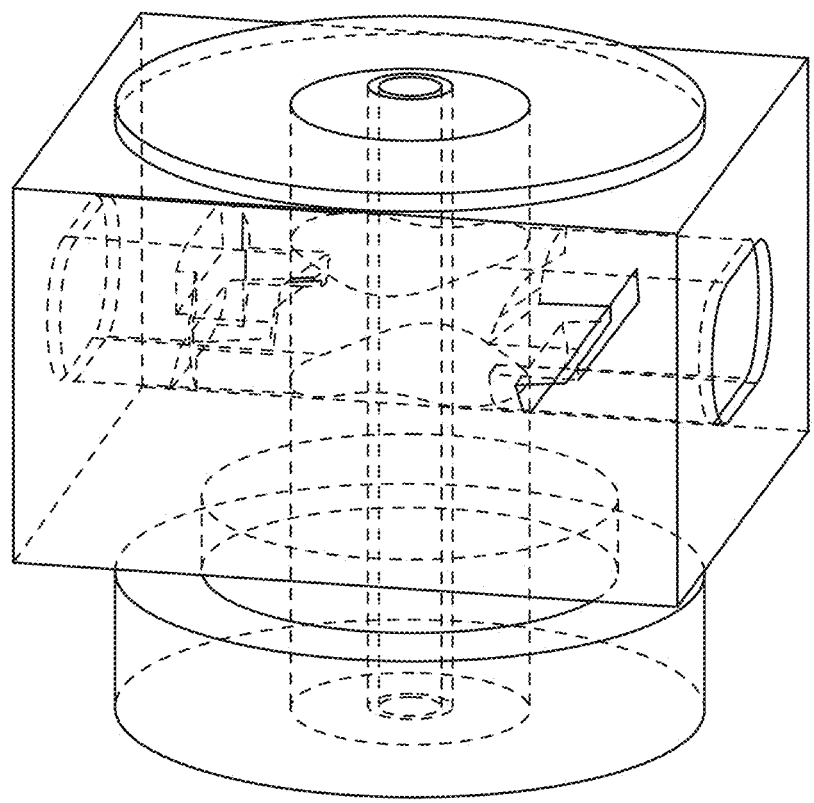
FIGS. 4A and 4B are 3D Simulation Model Setups according to embodiments of the disclosure.
Figure 4B:
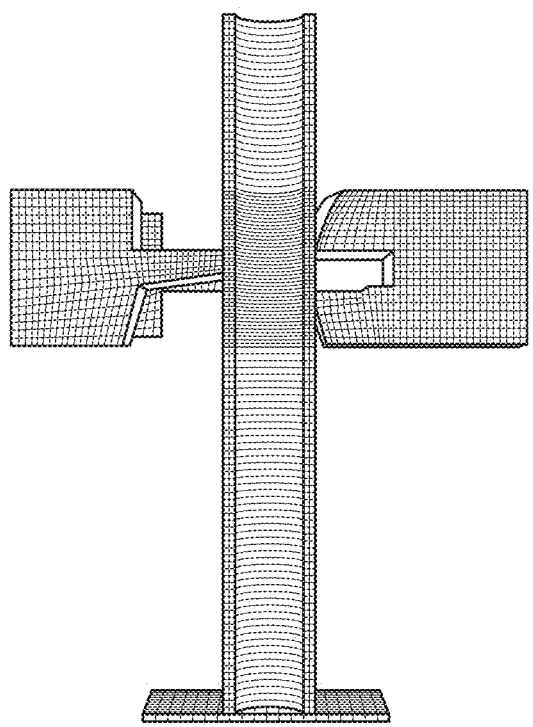

In an embodiment of the disclosure, a finite element analysis ("FEA") model of the ram BOP is set up to simulate the shearing process, as shown in FIGS. 4A and 4B, and predict the reaction force and structural deformation, which include the shearing force/pressure, pipe deformation, and blade deformation. The digital model can then be used to replace traditional pipe shearing lab tests on ram BOP as further described below.

Traditionally, damage parameters are obtained from destructive tests on the given material. Another traditional way to determine the damage is to use hand calculation. Hand calculation predicts the shearing force or pressure of given pipe via comparing the pipe dimension and material with previously pipe shearing test data.

In an embodiment of the disclosure, a known Johnson-Cook damage model is used to describe the damage level incurred by the digital avatar of the BOP. The model is shown as below:

$$\overline{\varepsilon}^{pf} = (D_1 + D_2 \exp D_3 \sigma^*)\left(1 + D_4 \ln \frac{\dot{\varepsilon}_p}{\dot{\varepsilon}_0}\right)\left[1 - D_5\left(\frac{T - T_0}{T_{melt} - T_0}\right)^m\right]$$

where D1 to D5 are damage parameters.

The parameters D1 to D5 are obtained from generic material properties as shown below:

(D1, D2, D3, D4, D5)=f (chemical composition, E, v, YS, UTS, El, RA) where E is elastic modulus, v is Poisson's ratio, YS is yielding strength, UTS is tensile strength, El is elongation, and RA is reduction in area. The damage parameters are thus used in the damage model formula. The parameters are not the same for different materials.

In embodiments, the damage parameters are related to the generic properties based on analyzing the correlation between currently available damage parameters and generic properties, or between previous pipe shearing test results and generic properties. The damage parameters can then be defined as a function of generic material properties.

Figure 5:
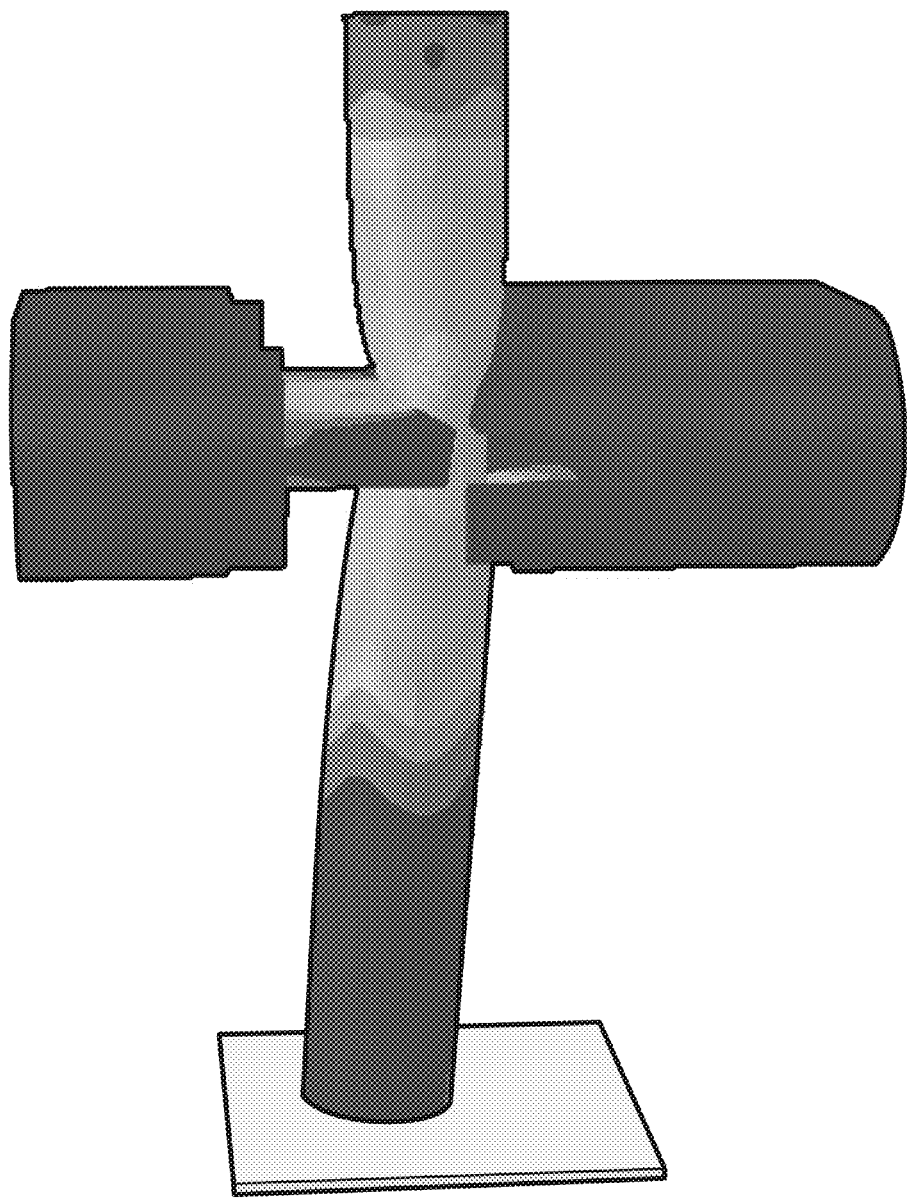
FIG. 5 represents a 3D simulation of pipe shearing using the BOP digital avatar as created according to embodiments of the disclosure.
Figure 6:
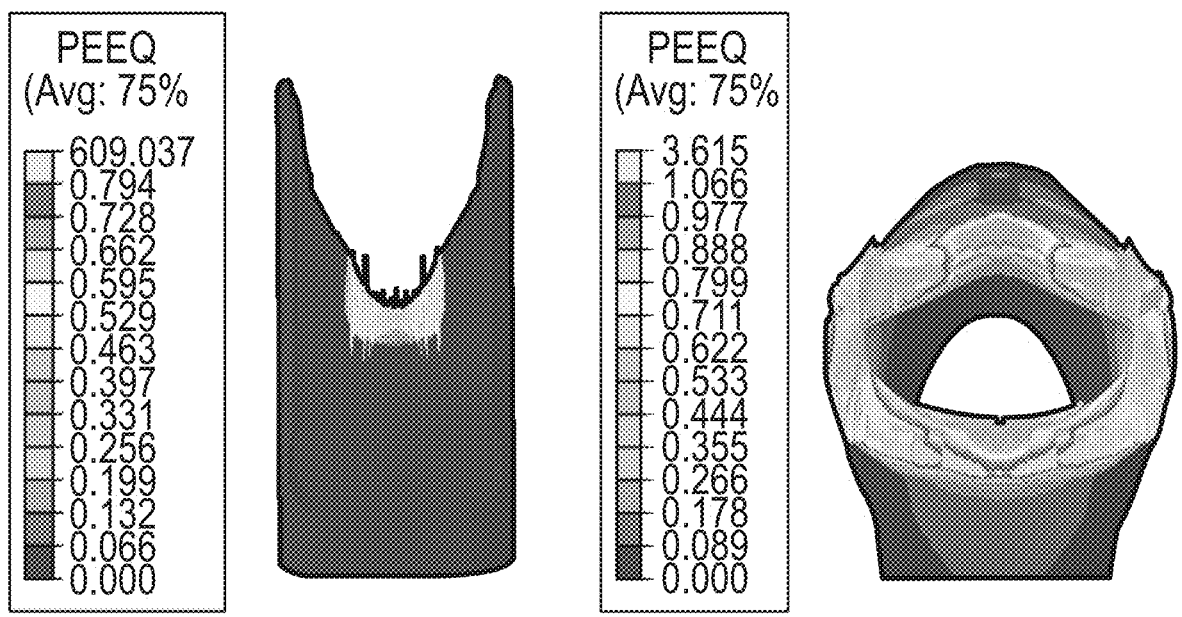
FIG. 6 represents simulation predictions according to embodiments of the disclosure.
Figure 6:
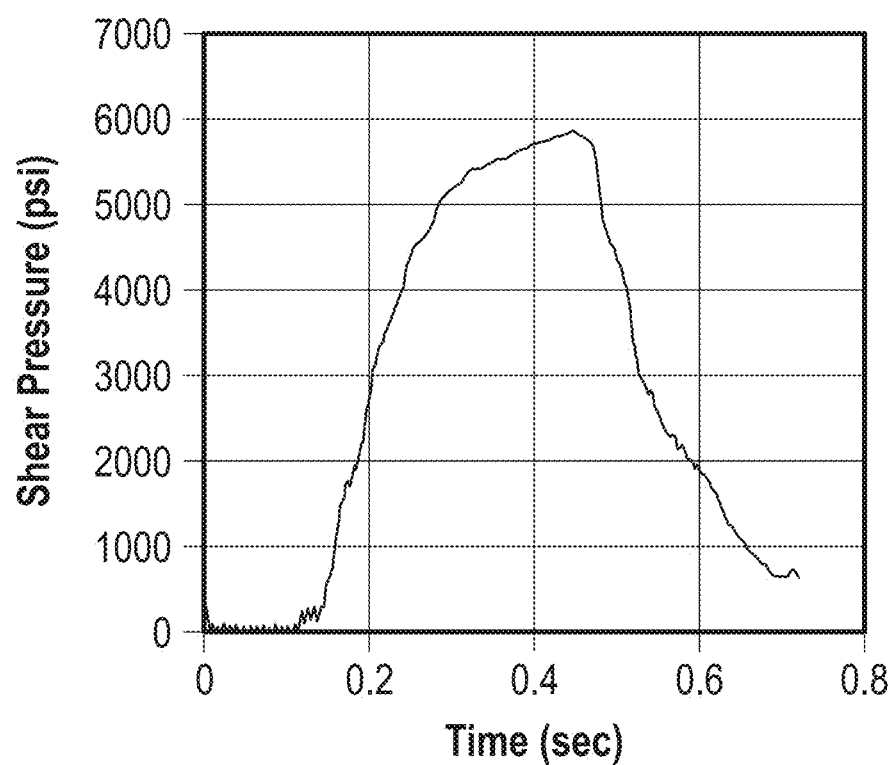

The 3D FEA simulation is then applied to replicate the shearing process as shown in FIG. 5, and generates the predictions of shearing pressure, pipe sheared cross section and blade deformation as shown in FIG. 6. The 3D FEA simulation model might be automatically linked to the corresponding ram BOP design. The model will thus automatically update itself when ram BOP design changes. The 3D simulation model of the ram BOP enables to vary the dimension of the ram blades and find the optimum dimension which will generate the lowest shearing pressure. In embodiments, a machine learning module can be added to the digital modeling method of the ram BOP, and then the model can automatically optimize the ram blade design or develop new design based on the database of previous pipe shearing test.

In embodiments, the module may be linked to cloud computing application and provide user interface on portable devices (such as smart phone, tablet, and laptop), so that user can run the simulation and check the results at the portable device while the massive computation is completed in cloud computing system. In embodiments, the module might be linked to drilling or well operation related software to provide a digital companion for ram BOP.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for" or "step for" performing a function, it is intended that such elements are to be interpreted under 35 U.S.C. 112(f). However, for any claims containing elements designated in any other manner, it is intended that such elements are not to be interpreted under 35 U.S.C. 112(f).

What is claimed:

1. A method to create a simulation of a shearing process for a ram blowout preventer (BOP), the method comprising:
   a. building a 3D digital model of the ram BOP including damage parameters based on generic material properties of the ram BOP, wherein the damage parameters are related to the generic material properties of the ram BOP based on analyzing a correlation between previous pipe shearing test results and the generic material properties;
b. inputting the 3D digital model of the ram BOP into a damage model;
c. simulating the shearing process using the 3D digital model of the ram BOP and the damage model; and
d. providing a 3D visualization of the shearing process via a user interface.

2. The method according to claim 1, wherein the generic material properties comprise at least one of chemical composition, elastic modulus, Poisson's ratio, yielding strength, tensile strength, elongation, and reduction in area.

3. The method according to claim 1, wherein the damage parameters are inputted into the damage model.

4. The method according to claim 1, wherein steps (a) to (d) are automated.

5. The method according to claim 4, wherein the 3D digital model of the ram BOP automatically updates upon design update of the ram BOP.

6. The method according to claim 4, wherein the dimensions of the 3D digital model of the ram BOP are varied, and the simulation of the shearing process is iterated to optimize the ram BOP design.

7. The method according to claim 4, wherein the effect of design tolerance of the 3D digital model on the shear pressure of the ram BOP is predicted by automatically simulating the shearing process for different ram dimensions where the dimension's variance is due to tolerance.

8. The method according to claim 1, wherein the 3D digital model of the ram BOP comprises opposed shear rams and a pipe.

9. The method according to claim 1, wherein the 3D visualization comprises a representation of opposed shear rams and a pipe during the shearing process.

10. The method according to claim 9, wherein the 3D visualization comprises the representation of opposed shear rams contacting the pipe during the shearing process.

11. The method according to claim 1, comprising providing the 3D visualization via the user interface on a portable device.

12. The method according to claim 11, comprising completing the building, inputting, and simulating via a cloud computing system.

13. A method to build a prediction model to give prediction on shear pressure for a ram blowout preventer (BOP) for a predefined range of operational parameters, the method comprising:
automatically, in response to input of an indication of the predefined range of operational parameters:
running a batch of shearing simulations to cover a plurality of different combinations in the predefined range of operational parameters, the operational parameters comprising damage parameters based on generic material properties of the ram BOP, wherein the damage parameters are related to the generic material properties of the ram BOP based on analyzing a correlation between previous pipe shearing test results and the generic material properties;
calculating the shear pressure for each combination; and
generating a response curve model using the calculated shear pressures for the plurality of different combinations.

14. The method of claim 13, wherein the predefined range of operational parameters comprises a set of operational parameters and a design tolerance for the set of operational parameters.

15. The method of claim 14, wherein the input of the indication of the predefined range of operational parameters comprises the set of operational parameters and the design tolerance.

16. The method of claim 13, comprising determining an optimum dimension for the ram BOP based on the response curve model.

17. The method of claim 16, comprising providing a 3D visualization of a shearing process for the ram BOP with the optimum dimension via a user interface.

* * * * *